United States Patent [19]

Tosuntikool et al.

[11] 4,207,436
[45] Jun. 10, 1980

[54] CONSTANT PERCENT BREAK TYPE DIAL PULSE CORRECTOR

[75] Inventors: Nam Tosuntikool; Robert Yapp, both of San Jose, Calif.

[73] Assignee: GTE Automatic Electric Laboratories, Incorporated, Northlake, Ill.

[21] Appl. No.: 928,117

[22] Filed: Jul. 26, 1978

[51] Int. Cl.² .............................................. H04Q 1/36
[52] U.S. Cl. ................................. 179/16 EA; 328/164
[58] Field of Search ........... 179/16 E, 16 EA, 16 EC; 178/70 R, 70 TS; 328/164; 307/234, 266

[56] References Cited

U.S. PATENT DOCUMENTS

| | | | |
|---|---|---|---|
| 3,092,691 | 6/1963 | Burns et al. | 179/16 EA |
| 3,312,784 | 4/1967 | Draper, Jr. | 179/16 E |
| 3,700,821 | 10/1972 | Savage | 179/16 EA |
| 3,794,775 | 2/1974 | Hicks et al. | 179/16 EA |
| 4,029,907 | 6/1977 | Jorgensen et al. | 328/164 |

Primary Examiner—Bernard Konick
Assistant Examiner—Randall P. Myers
Attorney, Agent, or Firm—Russell A. Cannon

[57] ABSTRACT

The first monostable multivibrator of a series connected pair of monostable multivibrators is responsive to each break interval of input dial pulses for establishing a fixed time delay after which the second multivibrator initiates a corrected break interval and starts a first timing capacitor thereof charging at a rate set by a fixed time constant. Each input break interval also causes a capacitor of a second timing circuit to start discharging at a rate set by another fixed time constant, the time that the second capacitor starts discharging being a function of the pulse repetition frequency of input dial pulses. When the charge voltages on the two capacitors are the same values, the output of a comparator resets the second multivibrator to terminate an output break interval so as to cause corrected dial pulses in the output thereof to have a constant percent break.

13 Claims, 3 Drawing Figures

CONSTANT PERCENT BREAK TYPE DIAL PULSE CORRECTOR

BACKGROUND OF INVENTION

This invention relates to pulse corrector circuits, and more particularly to an improved dial pulse corrector circuit in telephone signaling systems that provides corrected dial pulses with a constant percent break or duty factor.

Dial pulses in telephone systems are commonly produced by subscribed telephones at a pulse repetition frequency (PRF) in the order of 10 pulses per second with presecribed 60 millisecond break intervals and 40 millisecond make intervals. This corresponds to a 60 percent break. The PRF of dial pulses may vary somewhat, however, for equipment of different manufacturers. By way of example, equipment is available for producing dial pulses with PRFs varying from 7.5 pulses per second to 12 or 15 pulses per second. Also, dial pulses may be distorted in transmission through telephone circuitry such that the percent break of dial pulses varies as much as 90 percent during transmission. It is desirable, therefore, to employ equipment at various points of a telephone system to periodically adjust dial pulses having a range of pulse repetition frequencies to have a relatively constant percent break. The U.S. Pat. No. 3,092,691, Electronic Pulse Correction Circuit by R. T. Cleary and R. V. Burns, June 4, 1963, discloses a correction circuit for accomplishing such a function. The Cleary circuit comprises first and second series connected monostable multivibrators and a control circuit for selectively changing the value of the RC time constant of the second multivibrator at a time that is a function of the PRF of input dial pulses applied to the first multivibrator. This shortens the timing interval of the second multivibrator. In that corrector, an input break interval triggers the first multivibrator to set a time delay after which the second multivibrator is triggered to initiate a corrected break interval. The next input break interval causes the control circuit to then connect another resistor to the second multivibrator to vary the rate at which its timing capacitor charges in order to vary the time-out of the second multivibrator. This causes corrected dial pulses from the second multivibrator to have a substantially constant percent break even though the input percent break and PRF vary. In a printed circuit board version of this prior art pulse corrector, it has been found necessary to individually select timing resistors and capacitors of particular values in the second multivibrator and/or the control circuit during manufacture thereof. This hand operation requires the sole attention of an operator such that it is time consuming and expensive. In a thick film hybrid circuit version of this prior art corrector, it has been found necessary to individually functionally trim timing resistors on a substrate to precise values in order to make such pulse correctors operate properly. This trimming is required to adjust the nonlinear resistance curve of a thick film resistor so that it has a prescribed value for setting the time constant of the second multivibrator. These operations are also time consuming and expensive. U.S. Pat. No. 3,700,821, issued Oct. 24, 1952, to Bruce Russell Savage, discloses a "Digital Constant Percent Break Pulse Correcting Signal Timer" for performing a similar function.

An object of this invention is the provision of an improved dial pulse corrector circuit.

SUMMARY OF THE INVENTION

In accordance with this invention, a pulse corrector that receives a sequence of input pulses having a variable input duty factor and a variable PRF and is operative for repeating the input pulse sequence as corrected output pulses having a predetermined duty factor and the same PRF comprises: a first timing circuit responsive to initiation of each input pulse for producing a first timing signal establishing a first timing interval Td of a prescribed length; a second timing circuit responsive to initiation of each input pulse for initiating a second timing signal having an amplitude that may vary in one direction at a first rate set by an associated RC time constant which is constant; a third timing circuit responsive to termination of the first time interval for initiating a third timing signal establishing a third time interval and having an amplitude that may vary in the opposite direction at a second rate set by an associated RC time constant which is also fixed; and a control circuit that is responsive to the end of the first time interval associated with one input pulse for initiating an output pulse, and is responsive to a prescribed difference between the amplitudes of the third and second timing signals initiated in response to receipt of the one and the next input pulses for terminating the output pulse for selectively shortening the third time interval as a function of an increasing PRF of input pulses.

DESCRIPTION OF DRAWINGS

This invention will be more fully understood from the following detailed description of preferred embodiments thereof, together with the drawings in which.

DESCRIPTION OF PREFERRED EMBODIMENTS

Figure 1:
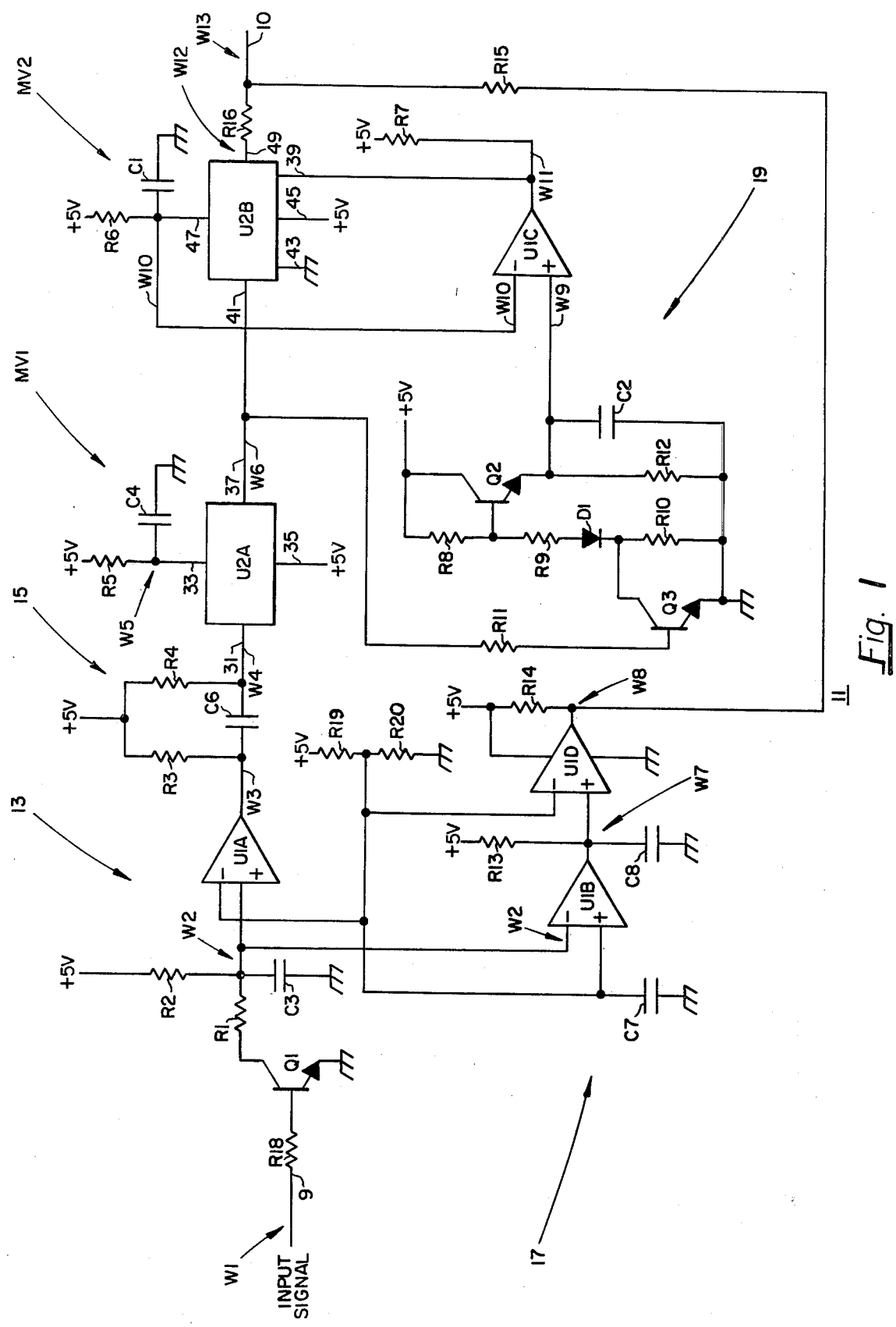
FIG. 1 is a schematic circuit diagram of a pulse corrector 11 embodying this invention.

Pulse corrector 11 in FIG. 1 generally comprises a noise suppressor 13, a differentiator 15, and first and second monostable multivibrators MV1 and MV2 that are connected in series between input line 9 and output line 10; a supervisory circuit 17; and a circuit 19 controlling the reset time of MV2. The operation of the corrector 11 is illustrated in and described by the waveforms in FIGS. 2 and 3 for signal voltages occurring at associated points in FIG. 1.

Although some references use an inverted representation here, the input signal W1 on line 9 indicates that an associated subscriber telephone (not shown) is on-hook prior to its going off-hook at time t2, spurious noise pulses 21 and 23 being present in W1 at times t1 and t5. The distorted input dial pulse indicated by solid lines in W1 between times t6 and t14 has a PRF of 7.5 pulses per second and a 31 percent break. The corresponding output dial pulse in W13 between time t10 and t19 has the same PRF and a constant percent break of 62 percent. In this example, the input break interval TBi is 41 milliseconds and the dial pulse width T01 is 133 milliseconds. The broken lines starting at time t11 illustrate a distorted input dial pulse having a higher pulse repetition frequency of 9 pulses per second (PPS) and a dial pulse width T02 of 111 milliseconds as is described hereinafter.

Briefly, the noise suppressor 13 produces an inverted, delayed and shaped version W3 of the input signal as it blocks noise pulses 21 and 23 from other portions of the corrector. This signal W3 is differentiated by R4 and C6 to produce negative going pulses in W4 at the start of each delayed break interval. The waveforms W5 and W6 illustrate the operation of MV1 in providing a fixed time delay Td on initiation of each delayed input break interval in W3 and negative going pulse in W4. The negative going pulse 27, for example, in W4 triggers MV1 which in turn cuts offf Q2 and starts the capacitor C2 of control circuit 19 discharging in W9 at a rate set by the time constant fixed by R12 and C2. Time out of MV1 in W6 causes timer U2A to clamp C2 to the voltage VH, triggers MV2 to initiate an output break interval in W12, and starts the timing capacitor C1 of MV2 charging in W10 at a rate set by another fixed RC time constant of R6 and C1. When MV1 is triggered at t15 in W6 in response to the next input break interval, C2 again starts to discharge in W9 toward the voltage V1. When the charge voltages on C1 and C2 for one and the next input break intervals differ by a prescribed amount, which may also be 0 volts, then comparator U1C produces an output pulse 25 in W11 which resets MV2 to terminate the output break interval in signals W12 and W13, e.g., at time t15. By properly selecting the fixed values of time constants associated with C1 and C2, reproduced dial pulses in the output W12 of MV2 are caused to have a constant percent break.

Considering the corrector circuit 11 in greater detail, the noise suppressor 13 comprises transistor Q1, timing elements R1, R2 and C3, and comparator U1A. When the input signal W1 is high for an on-hook condition, Q1 conducts to discharge C3 in W2 to V2 which is approximately ground potential. When the handset goes off-hook at time t2, the input W1 goes low to cut off Q1 and allow C3 to charge in W2 toward the supply voltage through R2 at a prescribed rate. When the dial contacts of the subscriber telephone open at time t6 for dialing the number 2, for example, the input W1 again goes high to turn on Q1 and discharge C3 in W2 at a rate which is a function of both R1 and R2. The comparator U1A squares the charge voltage on C3 as it exceeds and falls below the threshold voltage Vth1 of U1A. The charge and discharge time constants of C3 are selected so that the time intervals T1 and T2 in W2 for charging and discharging C3 to the threshold voltge Vth1 are greater than expected durations of noise pulses 21 and 23 in W1. In this manner, the corrector 11 is rendered substantially insensitive to such noise pulses on the input line. The time intervals T1 and T2 may, for example, be 15 milliseconds and 10 milliseconds long, respectively. The delayed and inverted dial pulses in W3 are differentiated by R4 and C6 to produce positive and negative going pulses in W4 on the rising and falling edges of the former.

The first monostable multivibrator MV1 comprises an integrated circuit package U2A having a terminal 33 connected to external timing elements C4 and R5. When MV1 operates in its astable state, U2A allows C4 to charge to approximately the supply voltage. U2A is responsive to each of the negative going impulses in W4, at the start of each delayed break interval in W3, for operating in its astable state to dump the charge on C4 and allow C4 to then charge toward the supply voltage. When the voltage on C4 subsequently exceeds the threshold Vth2 at t10 in W5, MV1 is reset and operates in its stable state with its output W6 low. The time delay Td in W6 is preferably set by the external timing elements R5 and C4 to be equal to the corrected-output make interval for the lowest PRF for which the corrector circuit 11 is to operate. This delay Td for a low range PRF of 7.5 pulses per second is approximately 50.6 milliseconds. If Td is less than this value, corrected dial pulses are slightly distorted at low PRFs. The package U2A may be one half of an intergrated circuit 556 dual timer manufactured by National Semiconductor, Inc., and Signetics. The 556 dual timer essentially comprises a pair of 555 timers that operate independently of each other, sharing only the supply voltage and ground.

The second monostable multivibrator MV2 is similar to MV1, except that it may be reset by a control signal on line 39. It comprises an integrated circuit package U2B having a terminal 47 connected to external timing elements C1 and R6. When MV2 operates in its stable state in W10 (prior to time out of MV1 in W6), the package U2B provides a low signal voltage on terminal 47 that rapidly discharges C1 and clamps it to the potential VL. The package U2B is responsive to each negative going transition in W6, i.e., each time out of MV1, for initiating a corrected break interval in its output W12 and removing the voltage VL from terminal 47 to allow C1 to charge toward the supply voltage at a rate that is set by the fixed time constant R6C1. As is described more fully hereinafter, when either the charge voltage on C1 is greater than the MV2 threshold voltage Vth4 in W10 or a pulse 25 signal in W11 is received on line 39, then MV2 is reset to drive W12 low. The duration of the natural or astable period TB1 of MV2 is preferably selected to be equal to the corrected break interval for input dial pulses having the lowest PRF for which the corrector circuit 11 is to operate. It may also be somewhat greater than this time interval. This period TB1 in W12 is approximately 82.5 milliseconds for a PRF of 7.5 pulses per second. The package U2B may be the other half of an integrated circuit model NE 556 dual timer.

The timing control circuit 19 comprises timing elements C2 and R12, a transistor Q2 for selectively allowing C2 to charge, a transistor Q3 that is responsive to the output W6 of MV1 for controlling the operation of Q2, and a comparator U1C which monitors the charge voltages on timing capacitors C1 and C2. During normal operation when an associated subscriber telephone is not generating dial pulses, the output W6 of MV1 is low to cut off Q3 and turn on Q2 to charge C2 in W9 to approximately VH. When MV1 is triggered following initiation of each delayed break interval, W6 goes high to turn on Q3 to bypass drive current away from Q2 and cut if off. This causes C2 to discharge through R12 in the direction toward the voltage V1 that is set by R8 and R9. C2 discharges at a rate which is set by the fixed time constant R12C2. When MV1 returns to its stable state at t10, the signal W6 again goes low to cut off Q3 and turn Q2 on to rapidly charge C2 to the voltage VH. Comparator U1C is responsive to the charge voltages W10 and W9 on C1 and C2 for switching operating states to drive the signal W11 low and reset MV2 when these charge voltages W9 and W10 are substantially the same magnitudes, e.g., at t15. This causes the voltage at terminal 47 of U2B to go low to dump the charge on C1 and clamp it to VL. This new voltage on C1 causes comparator U1C to again switch operating states so that its output W11 is then high. As is illustrated in broken lines in W6 and W9 and described more fully hereinafter, when MV1 is triggered at earlier instants in time for input dial pulses of higher pulse repetition frequencies, then C2 starts to discharge at earlier instants in time. But always at the same rate. This causes U1C to switch operating states earlier so tht the duration of output break intervals in W12 are selectively shortened as a function of the PRF of input dial pulses. The percent break remains constant, however.

The supervisory circuit 17 comprises a pair of comparators U1B and U1D, and a timing circuit C8 and R13. The operation of circuit 17 is conventional and illustrated in waveforms W7 and W8. The circuit 17 operates to detect and indicate in W8 and W13 when the handset of an associated subscriber telephone goes off-hook at t4 and on-hook for more than a prescribed time interval of say 110 milliseconds from time t21 to t24. The signal W13 is a combination of the signals W8 and W12.

The overall operation of corrector 11 will now be summarized. Input dial pulses in W1 from time t6 are delayed and reproduced in inverted form in W3. The negative going pulse 27 in W4 at the start of a delayed break interval triggers MV1 to establish the time delay Td in W6 which turns off Q2 to discharge C2 through R12 in W9. The corrector is unresponsive to termination of the input break interval in W1 and W3. On timeout of MV1 at t10, however, the negative transition in W6 causes C2 to rapidly charge to the voltage VH in W9. It also triggers MV2 to initiate an output break interval 29 in W12 and W13 and causes C1 to charge in W10 towards VH. Since dial pulses in W1 are of the lowest PRF for which the corrector is designed to operate, however, MV2 times out at its natural rate at t15, which is also the time that the charge voltage on C1 is equal to that on C2. This is the time t15 when the delayed dial pulse in W3 goes low in response to the next break interval in W1. The comparator U1C therefore produces a pulse 25 in W11 and on line 39 for resetting MV2. This causes the outputs W12 and W13 to go low to terminate the corrected break interval 29 at t15 there. The negative going pulse 53 in W4 at t15 also triggers MV1 to initiate another delay Td in W6. The high signal level in W6 at this time again causes Q3 to cut off Q2 and initiate discharge of C2 at the same rate as before. When MV1 times out in W6 at t19 for the second input break interval, C2 is rapidly charged in W9 to VH and MV2 is triggered by the negative transistion in W6. This causes W12 and W13 to go high as indicated by the solid line at t19 there to terminate one cycle of the corrected dial pulse. It also enables C1 to charge to repeat this cycle of operation. The output dial pulse between time t10 and t19 in W12 has a 62 percent break.

Reference to signals W1 and W12 reveals that the input dial pulse width T01 in W1 is equal to the output period T01 in W12. The input break interval TBi in W1 is 31 percent of T01, however, whereas the output break interval TB1 in the corrected dial pulse in W12 is 62 percent of T01. Thus, corrector 11 has transformed a distorted input dial pulse at times t6 to t14 with a PRF of 7.5 pulses per second and an input break pulse ratio of 31 percent to a corrected-output dial pulse with the same PRF and a desired break pulse ratio of 62 percent.

Figure 2:
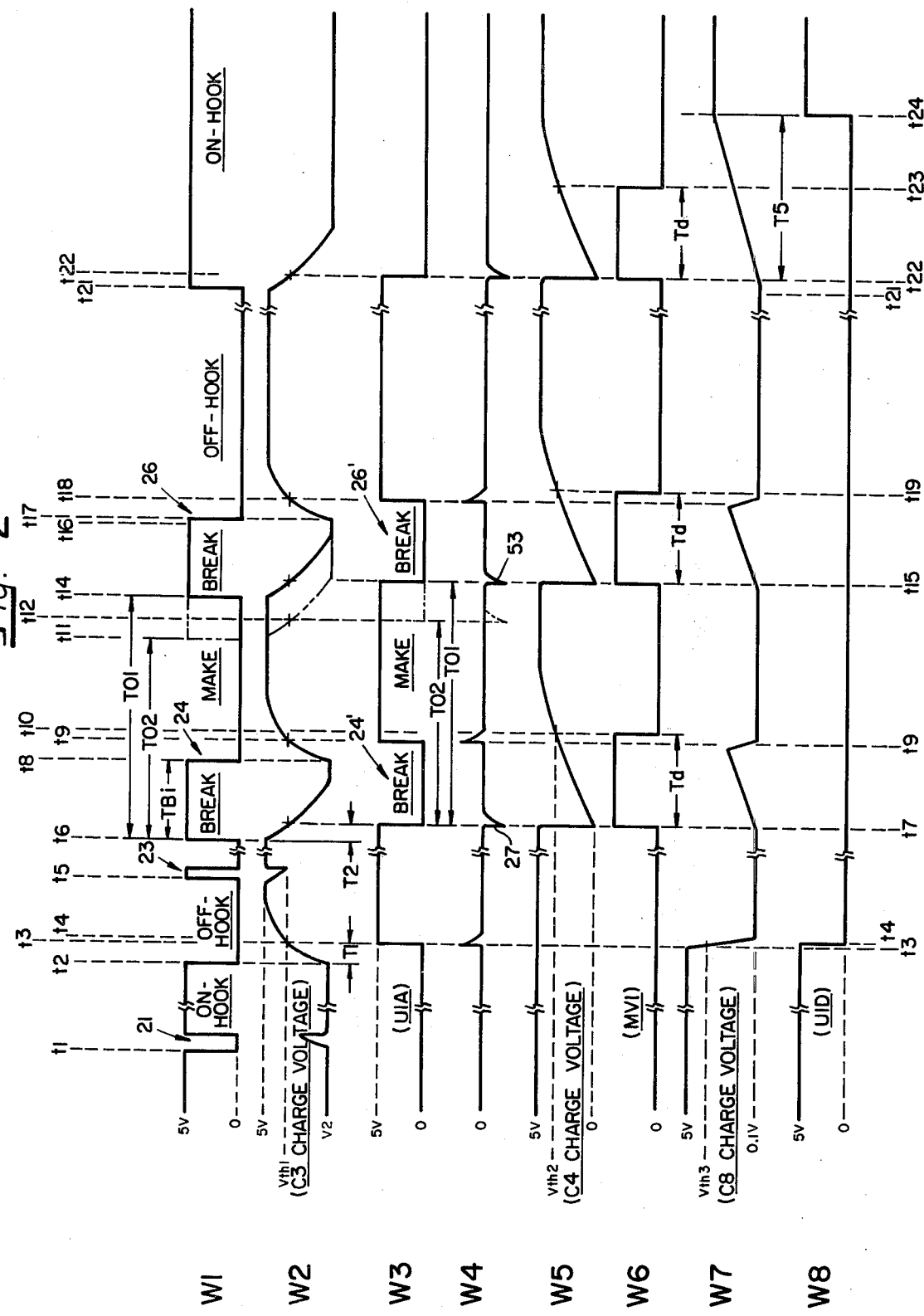
FIGS. 2 and 3 are waveforms illustrating the operation of the pulse corrector 11 in FIG. 1 and occurring at designated points thereof.
Figure 3:
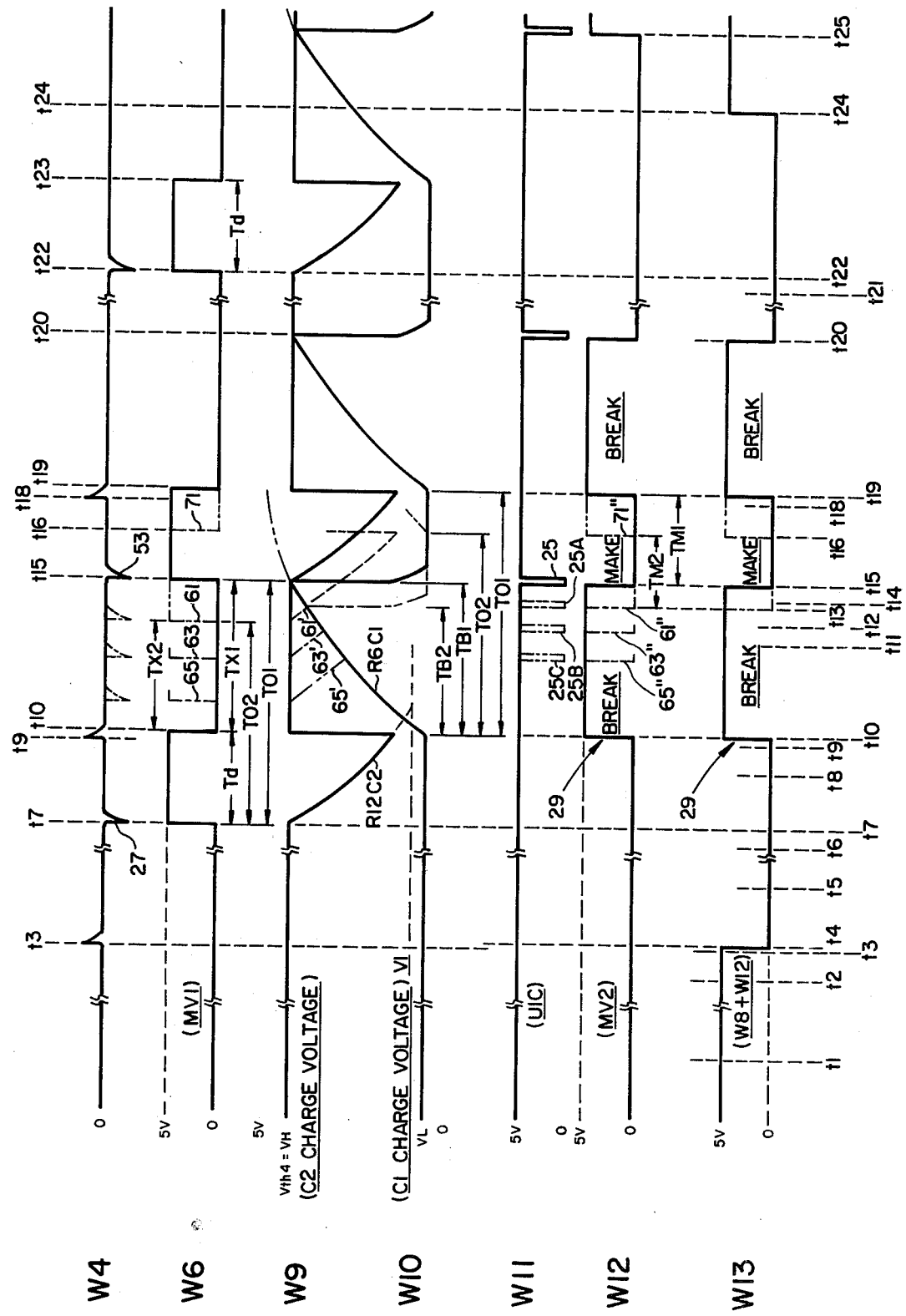

As the PRF of dial pulses in W1 increases, the time that the second break pulse occurs in W1 moves to the left in FIG. 2 from time t14. The lines and curves in broken lines in W1, W2, W3 and W4 from t11 indicate circuit operation for an input dial pulse with a repetition rate of 9 pulses per second. This causes MV1 in W6 of FIG. 3 to be triggered earlier in time and the time interval Tx that MV1 operates in its stable state to be shortened. It also causes C2 to start discharging in W9 at an earlier instant in time. The dashed lines 61, 63 and 65 in W6 indicate the operation of MV1 for PRFs of 9, 11 and 15 pulses per second. The corresponding dash lines 61', 63' and 65' in W9 show that C2 starts to discharge at earlier instants in time, but always at the same rate that is set by the fixed RC time constant R12C2. This causes the voltages on C2 and C1 to be the same magnitudes at earlier instants in time for triggering the comparator U1C to reset MV2 and terminate output break intervals at earlier instants in time. The charge voltage on C2 is returned to the voltage VH in each instance on time out of MV1 and the end of each delay interval Td. The broken lines 61" and 71" in W12 indicate early reset of MV2 at time t13 to terminate the corrected output break interval of width TB2 and triggering of MV2 at time t16 to terminate one cycle of the corrected dial pulse in W12 for input dial pulses occurring at 9 pulses per second. This output dial pulse between time t10 and t16 also has a 62 percent break. In this manner, the duration of output break intervals in W12 and W13 are selectively shortened as a function of the PRF of input dial pulses. This operation causes corrected dial pulses in W12 to have a substantially constant percent break. This is seen to be true even though input PRFs vary over a range of values and the input percent break also varies.

In a dial pulse corrector embodying this invention that was built or successfully operated, the circuit packages U2A and U2B were each one-half of the same Ne 556 integrated circuit dual timer manufactured by Signetics and the comparators U1A, U1B, U1C and U1D were sections of the same LM 3302 integrated circit quadcomparator manufactured by National Semiconductor, Inc. The external timing resistors and capacitors were standard production components with ±1 percent and ±5 percent tolerances. This pulse corrector was designed to produce an output W13 with constant 62 percent break pulse ratios for input PRFs of 7.5 to 15 PPS. In practice, corrected break pulses in the output W13 varied from only 57.5 percent at 7.5 PPS to only 66.5 percent at 15 PPS, and between 60 percent and 64 percent in the range of 8 to 12 PPS.

Although this invention is described in relation to preferred embodiments thereof, variations and modifications thereof will occur to those skilled in the art. By way of example, the circuits MV1 and MV2 may comprise other than integrated circuit packages U2A and U2B. Also, the corrector 11 may be implemented in digital form. Further, the corrector is useful in correcting pulses of a sequence of other than dial pulses to have a constant duty factor. Although the time delay Td is described in the example here as being equal to the output make interval at the lowest PRF for which the corrector is designed to operate, it may also be greater than this time interval. This merely means that C2 starts to discharge before timeout of MV2 for the lowest PRF (e.g., line 61' in W9). Similarly, the time interval that MV2 naturally operates in its astable state may be greater than the output break interval for the lowest PRF for which the corrector is to operate. This merely means that MV2 never times out at its natural rate. In this manner the slopes of the charge voltages in C1 and C2 may be readily varied to select the points at which comparator U1C operates to reset MV2. Also, the comparator U1C may operate for a prescribed difference between the charge voltages on the two timing capacitors. Further the charge voltage on C2 may be reset to the level VH prior to termination of the delay interval Td, such as by using the output of U1C to turn Q2 on. The scope of this invention is therefore to be determined from the attached claims rather than the aforementioned detailed descriptions.

What is claimed is:

1. A pulse corrector circuit receiving a sequence of input pulses having a variable input duty factor and a variable input pulse repetition frequency (PRF), and being operative for repeating the input pulse sequence as corrected output pulses having a substantially constant duty factor and a repetition frequency substantially equal to that of input pulses comprising:

first means responsive to initiation of each input pulse for producing a first timing signal establishing a first timing interval of a prescribed length;

second means responsive to initiation of each input pulse for initiating a second timing signal having an amplitude that may vary in one direction from a first prescribed value at a first rate set by an associated first RC time constant which is constant;

third means responsive to termination of the first time interval for initiating a third timing signal establishing a third time interval and having an amplitude which may vary in a direction opposite to the one direction from a second prescribed value at a second rate set by an associated second RC time constant which is also fixed; and fourth means responsive to the end of the first time interval associated with one input for initiating an output pulse and being responsive to a prescribed difference between the values of the amplitudes of said third timing signal and said second timing signal initiated in response to receipt of the one and next input pulses for terminating the output pulse, the times at which said first and second means initiate timing signals varying as a function of the pulse repetition frequency of input pulses for causing corrected output pulses to have a substantially constant duty factor.

2. The circuit according to claim 1 wherein the prescribed length of the first time interval is substantially equal to or greater than the desired interval between output pulses at the lowest PRF at which the circuit is to operate; and said fourth means is responsive to the end of the first time interval associated with the next input pulse for initiating another output pulse to terminate one cycle of the corrected output pulses.

3. The circuit according to claim 2 where said second means comprises a first capacitor, a first resistor and fifth means clamping the charge voltage on the first capacitor to a first prescribed voltage value prior to the start of each first time interval and allowing the charge voltage on said capacitor to vary in the one direction toward a second prescribed voltage value during the first time interval at a rate set by the first fixed time constant.

4. The circuit according to claim 3 wherein said third means comprises a second capacitor and a second resistor; said fourth means clamping the charge voltage on said second capacitor to the second voltage prior to the end of each first time interval and allowing the charge voltage on said second capacitor to change at the end of each first time interval in the opposite direction toward the first voltage at a rate established by the second fixed time constant; said fourth means being operative for terminating an output pulse therefrom when the difference between the charge voltages on said capacitors is the prescribed value which may be 0 volts.

5. The circuit according to claim 4 wherein the amplitudes of the second and third timing signals vary at substantially linear rates to the point that they differ by the prescribed value; said fifth means clamping the charge voltage on the first capacitor to the first voltage at times other than during the first time interval; and said fourth means again clamps the charge voltage on said second capacitor to the second voltage when the difference between the amplitudes of the second and third timing signals is the prescribed value.

6. The circuit according to claim 5 wherein said third and fourth means together comprise a resettable monostable multivibrator circuit which is triggered to operate in its astable state at the end of each first time interval to initiate a corrected output pulse; said fourth means further comprising a voltage comparator responsive to charge voltages on said first and second capacitors for producing an output signal of the amplitude when the charge voltages are substantially different values and an output signal of an other value which resets the monostable multivibrator to terminate the corrected output pulse when the charge voltages are substantially the same values.

7. In a pulse corrected circuit for repeating a sequence of input dial pulses as output dial pulses having a substantially constant prescribed percent break, which is substantially independent of variations in the percent break and pulse repetition frequency (PRF) of input dial pulses, and including a first monostable circuit means establishing a first timing interval of fixed duration in response to each input break interval; a second monostable circuit means responsive to the end of each first timing interval for initiating an output break interval and being capable of operation in its astable state for a second time interval; and means responsive to initiation of each first timing interval for selectively shortening the second timing interval as a function of the time between the start of one and a subsequent input break interval; the improvement wherein:

the second monostable circuit means has an associated first fixed time constant setting the maximum duration of the second time interval during which it may operate in its astable state to be substantially equal to or greater than the output break interval for the lowest repetition frequency at which the corrector is to operate; said second monostable circuit means starting at the end of each first timing interval a first timing signal which has an amplitude that may vary in one direction at a first rate set by the first fixed time constant;

the shortening means comprises a timing circuit means having a second fixed time constant and initiating a second timing signal at the start of each first time interval, the second timing signal having an amplitude which may vary in the opposite direction at a second rate set by the second time constant; and the shortening means further comprises means responsive to the difference between the amplitudes of the first and second timing signals associated with one end subsequent input break intervals for resetting the second monostable circuit means to terminate an output break interval when this difference is a prescribed value.

8. The improvement according to claim 7 wherein the timing circuit means is responsive to the end of each first time interval for terminating the second timing signal, said difference means causing the second monostable circuit means to terminate the first timing signal when the second monostable circuit means is reset.

9. The improvement according to claim 8 wherein the second and first timing signals are clamped to one and other voltages which are different values upon termination thereof.

10. The improvement according to claim 9 wherein the first timing interval is substantially equal to the output make interval at the lowest repetition frequency at which the corrector circuit is to operate.

11. The improvement according to claim 10 wherein said timing circuit means further comprises a first capacitor and a first resistor and is operative for clamping the charge voltage on said first capacitor to the one voltage at times other than during the first time interval and for allowing said first capacitor charge voltage to change in the opposite direction toward the other voltage during the first time interval at a rate established by the second fixed time constant; and said second monostable circuit means comprises a second capacitor and a second resistor, and is operative for clamping the charge voltage on said second capacitor to the other voltage prior to the end of a first time interval and for allowing said second capacitor charge voltage to change in the one direction toward the one voltage at the end of the first time interval.

12. The improvement according to claim 11 wherein said difference means comprises a voltage comparator responsive to the charge voltages on said capacitors for producing an output signal when the charge voltages are substantially the same values for resetting the second monostable circuit means to terminate an output break interval.

13. In a pulse corrector circuit for repeating a sequence of input dial pulses as output dial pulses having a substantially constant prescribed percent break, which is substantially independent of variations in the percent break and pulse repetition frequency (PRF) of input dial pulses, and including a first monostable circuit means establishing a first timing interval of fixed duration in response to each input break interval; a second monostable circuit means responsive to the end of each first timing interval for initiating an output break interval and being capable of operation in its astable state for a second time interval; and means responsive to initiation of each first timing interval for selectively shortening the second timing interval as a function of the time between the start of one and a subsequent input break interval; the improvement wherein:

the shortening means and the second monostable circuit means produce first and second timing signals having amplitudes that may vary in opposite directions, at rates set by fixed RC time constants, on initiation and termination of each first time interval, respectively; and the shortening means comprises difference means responsive to the difference between the amplitudes of the second and first timing signals asociated with one and subsequent input brak intervals for resetting the second monostable circuit means to terminate an output break interval when this difference in a prescribed value.

* * * * *